US008280950B2

(12) United States Patent
Boruhovski et al.

(10) Patent No.: US 8,280,950 B2
(45) Date of Patent: Oct. 2, 2012

(54) AUTOMATIC CLIENT-SERVER CODE GENERATOR

(75) Inventors: Gil Boruhovski, Rehovot (IL); Efri Zeidner, Haifa (IL)

(73) Assignee: Xsignnet Ltd., Herzliya (IL)

( * ) Notice: Subject to any disclaimer, the term of this patent is extended or adjusted under 35 U.S.C. 154(b) by 333 days.

(21) Appl. No.: 12/699,179

(22) Filed: Feb. 3, 2010

(65) Prior Publication Data

US 2011/0191405 A1    Aug. 4, 2011

(51) Int. Cl.
*G06F 15/16* (2006.01)
(52) U.S. Cl. ......... 709/203; 715/760; 713/170; 717/105
(58) Field of Classification Search .................. 709/203; 715/760
See application file for complete search history.

(56) References Cited

U.S. PATENT DOCUMENTS

| 7,509,584 | B2 * | 3/2009 | Moser | 715/760 |
| 7,543,267 | B2 * | 6/2009 | Lindhorst et al. | 717/105 |
| 7,694,140 | B1 * | 4/2010 | Sachenko et al. | 713/170 |
| 2010/0281107 | A1 * | 11/2010 | Fallows et al. | 709/203 |

OTHER PUBLICATIONS

"Protocol Buffers", Retrieved on Sep. 8, 2011 at <<http://code.google.com/p/protobuf/>>, pp. 1-2.
Watanabe et al., "Reflection in an object oriented concurrent language" (Abstract), Retrieved on Sep. 8, 2011 at <<http://portal.acm.org/citation.cfm?id=62084.62111>>, ACM SIGPLAN Notices—Special issue: OOPSLA 1988 Conference Proceedings, Nov. 1988, vol. 23, No. 11, ACM, New York, NY.
McCluskey, "Using Java Reflection", Retrieved on Sep. 8, 2011 at <<http://java.sun.com/developer/technicalArticles/ALT/Reflection/>>, pp. 1-9, Sun Microsystems, Inc.
"Automating Reflection FTP Client File Transfers", Retrieved on Sep. 8, 2011 at <<http://support.attachmate.com/techdocs/1308.html>>, pp. 1-2.
"Reflection (computer programming)", Retrieved on Sep. 8, 2011 at <<http://en.wikipedia.org/wiki/Reflection_(computer_science), pp. 1-9.
"Serialization", Retrieved on Sep. 8, 2011 at <<http://en.wikipedia.org/wiki/Data_serialization>>, pp. 1-9.
"SOAP", Retrieved on Sep. 8, 2011 at <<http://en.wikipedia.org/wiki/SOAP_(protocol)>>, pp. 1-5.

* cited by examiner

*Primary Examiner* — Yves Dalencourt
(74) *Attorney, Agent, or Firm* — The Law Office of Michael E. Kondoudis (57) ABSTRACT

A system and method which enables clients to automatically generate client CLI response-objects directed for reading new unfamiliar server CLI response-objects which are received from servers without the need to write or obtain new code for each new server response-object.

19 Claims, 4 Drawing Sheets

AUTOMATIC CLIENT-SERVER CODE GENERATOR

FIELD OF THE INVENTION

This invention relates to the field of client server communication and more specifically to client server communication via a command line interface.

BACKGROUND OF THE INVENTION

Client-server networking is a distributed programming architecture where tasks are performed by one or more service providers (servers) in response to requests sent by one or more clients. A client process is a program enabling to send messages to a server process, the messages requesting that the server performs a task (service). A server process is a program configured for performing one or more tasks in response to a request issued by a client. In general clients initiate communication sessions with servers which listen to incoming requests. Servers may receive requests from clients to perform a variety of tasks concerning for example, database retrieval and updates, data integrity management, storage system configuration such as volume creation, volume deletion, file system modification, etc. In a computer network, clients and servers often operate on separate hardware.

Most often, servers send a response to a client's requests (or command). A response may be sent immediately once the request is received by the server or following the execution of the requested task. A server-response may include different types of information. For example, a server-response may include specific information requested by the client, a message indicating that the request has safely reached its destination, or it may comprise of status information informing the client e.g. whether the server has successfully completed the task or whether the server failed to do so. Clients are specifically configured for reading these responses, where different responses require specific adaptation of the client for reading them.

SUMMARY OF THE INVENTION

According to a first aspect of the invention there is provided a method of automatic generation of client CLI response-objects, the objects being configured for reading a server CLI response-object sent by a server to a client in response to a CLI-command sent by the client, the method being carried out in a client, and comprising:
(a) receiving from the server at least one CLI response comprising at least a server CLI response-object and a client class-header of a corresponding client CLI communication class, the client CLI communication class being configured for generating the client CLI response-object for reading the server CLI response-object;
(b) receiving the client CLI communication class;
(c) generating a client CLI response-object configured for reading the server CLI response-object, wherein the generating is based on the received client CLI communication class and the received client class-header and by using a processor for utilizing reflection programming; and
(d) utilizing the client CLI response-object for reading data provided within the server CLI response-object, wherein the utilizing is performed by using a processor.

According to a second aspect of the invention there is provided a method of automatic generation of client CLI response-objects configured for reading a server CLI response-object sent by a server to a client in response to a CLI command sent by the client, the method being carried out in a server and comprising:
(a) configuring the server with a server CLI communication class and a corresponding client CLI communication class and client class-header; the server CLI communication class is adapted for generating a server CLI response-object for the CLI-command, and the client CLI communication class is adapted for generating a client CLI response-object for reading data within the CLI response-object;
(b) generating a server CLI response-object of the CLI-command, wherein the generating is based on the server CLI communication class and is performed by using a processor, and;
(c) sending a CLI response to the client in reply to an incoming CLI-command from the client; the CLI response comprising at least the server CLI response-object and the client class-header; and
(d) sending the client CLI communication class to the client; wherein the client CLI communication class and the client class-header enable the client to generate, with the help of reflection programming, a client CLI response-object, and to utilize the client CLI response-object for reading information from the server CLI response-object.

According to a third aspect of the invention there is provided a client being operable in a client-server communication architecture, the client being configured to read a server CLI response-object sent by a server in response to a CLI-command, the client comprising:
a processor, and a client CLI process, the client CLI process comprising a CLI object generator; the processor being configured to perform tasks in response to instructions generated by the client;
the client CLI process is configured to send a CLI-command to a server and receive a CLI response from the server, the CLI response comprising a client CLI communication class, a client class-header and a server CLI response-object;
the client CLI object generator is configured to provide the processor with instructions for generating a client CLI response-object, wherein the client CLI response-object is generated with the help of reflection programming, based on the client class-header and the client CLI communication class;
the CLI process is further configured to provide the processor with instructions for utilizing the client CLI response-object for reading the server CLI response-object.

According to a fourth aspect of the invention there is provided a server being operable in client-server communication architecture, the server being configured for receiving a CLI-command from a client and returning a server CLI response-object to the client, the server comprising:
a CLI server process and a processor; the processor being configured to perform tasks in response to instructions generated by the server;
in response to a CLI-command received from a client, the CLI server process is configured to instruct the processor to perform at least the following:
(a) retrieve from the data-repository a corresponding server CLI communication class configured for generating a server CLI response-object corresponding to the CLI-command;

(b) retrieve from the data-repository a corresponding client CLI communication class configured for generating a CLI object for reading the server CLI response-object;
(c) retrieve from the data-repository a client class-header corresponding to the client CLI communication class;
(d) generate a server CLI-response-object being an instance of the server CLI communication class;
the CLI server application is further configured to send to the client a CLI-response, the CLI response comprising the server CLI-response-object, the client class-header and the client CLI communication class, thereby enabling the client to utilize the client class-header and the client CLI communication class and with the help of reflection programming, to generate a client CLI response-object configured for reading the server CLI response-object.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Unless specifically stated otherwise, as apparent from the following discussions, it is appreciated that throughout the specification discussions utilizing terms such as "processing", "computing", "determining", "generating", "recognizing", "setting", "configuring", "identifying" or the like, refer to the action and/or processes of a computer that manipulate and/or transform data into other data, said data represented as physical, e.g. such as electronic, quantities and representing the physical objects. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices and combinations thereof.

The operations in accordance with the teachings herein may be performed by a computer specially constructed for the desired purposes or by a general purpose computer specially configured for the desired purpose by a computer program stored in a computer readable storage medium.

In addition, embodiments of the present invention are not described with reference to any particular programming language. It will be appreciated that a variety of programming languages may be used to implement the teachings of the inventions as described herein.

As used herein, the phrase "for example," "such as" and variants thereof describing exemplary implementations of the present invention are exemplary in nature and not limiting. Reference in the specification to "one embodiment", "an embodiment", "some embodiments", "another embodiment", "other embodiments", "certain embodiment" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments", "certain embodiments" or variations thereof do not necessarily refer to the same embodiment(s).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. While the invention has been shown and described with respect to particular embodiments, it is not thus limited. Numerous modifications, changes and improvements within the scope of the invention will now occur to the reader.

Figure 1:
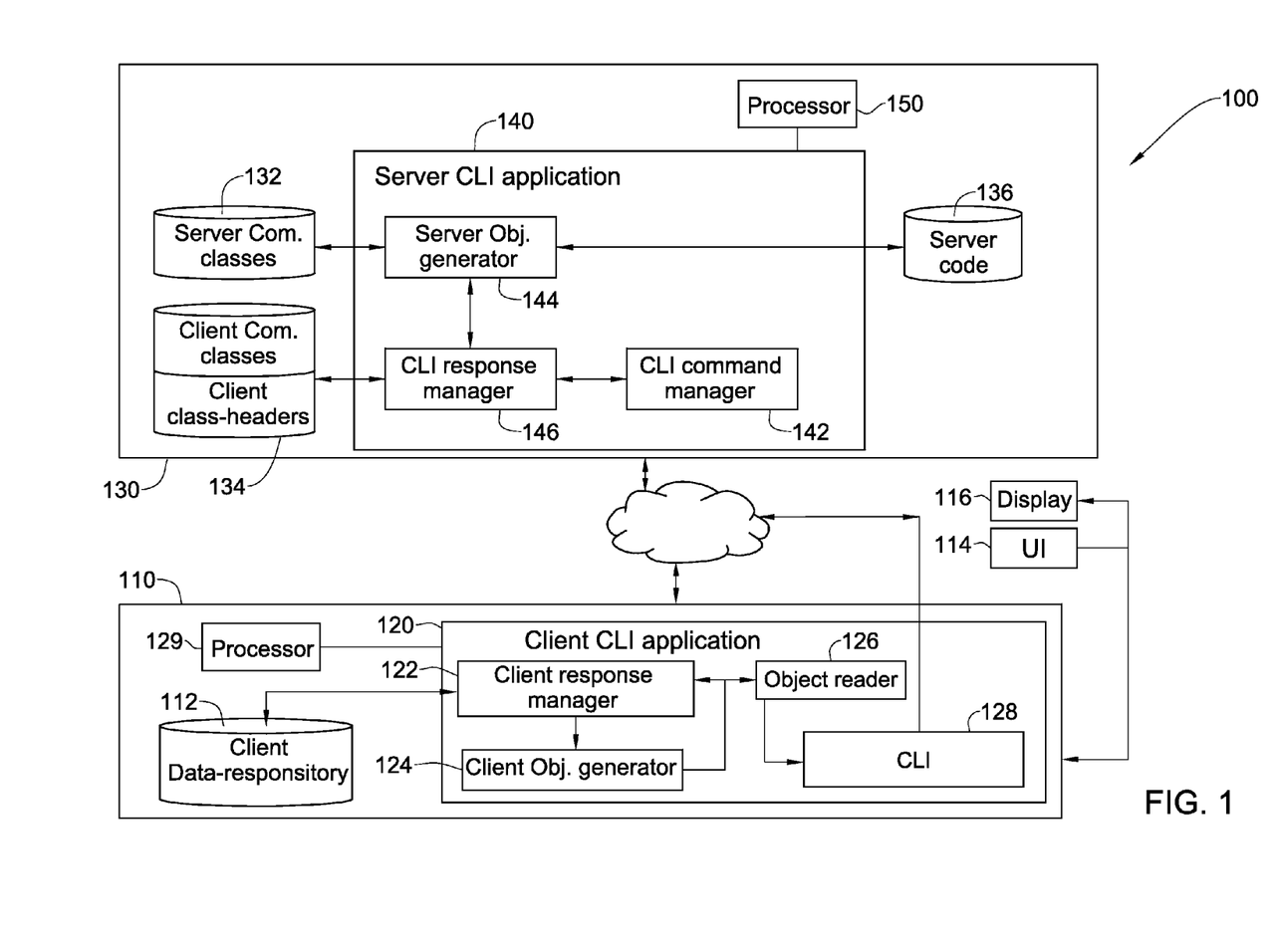
FIG. 1 is a block diagram schematically illustrating client-server architecture, in accordance with an embodiment of the invention.
Figure 2:
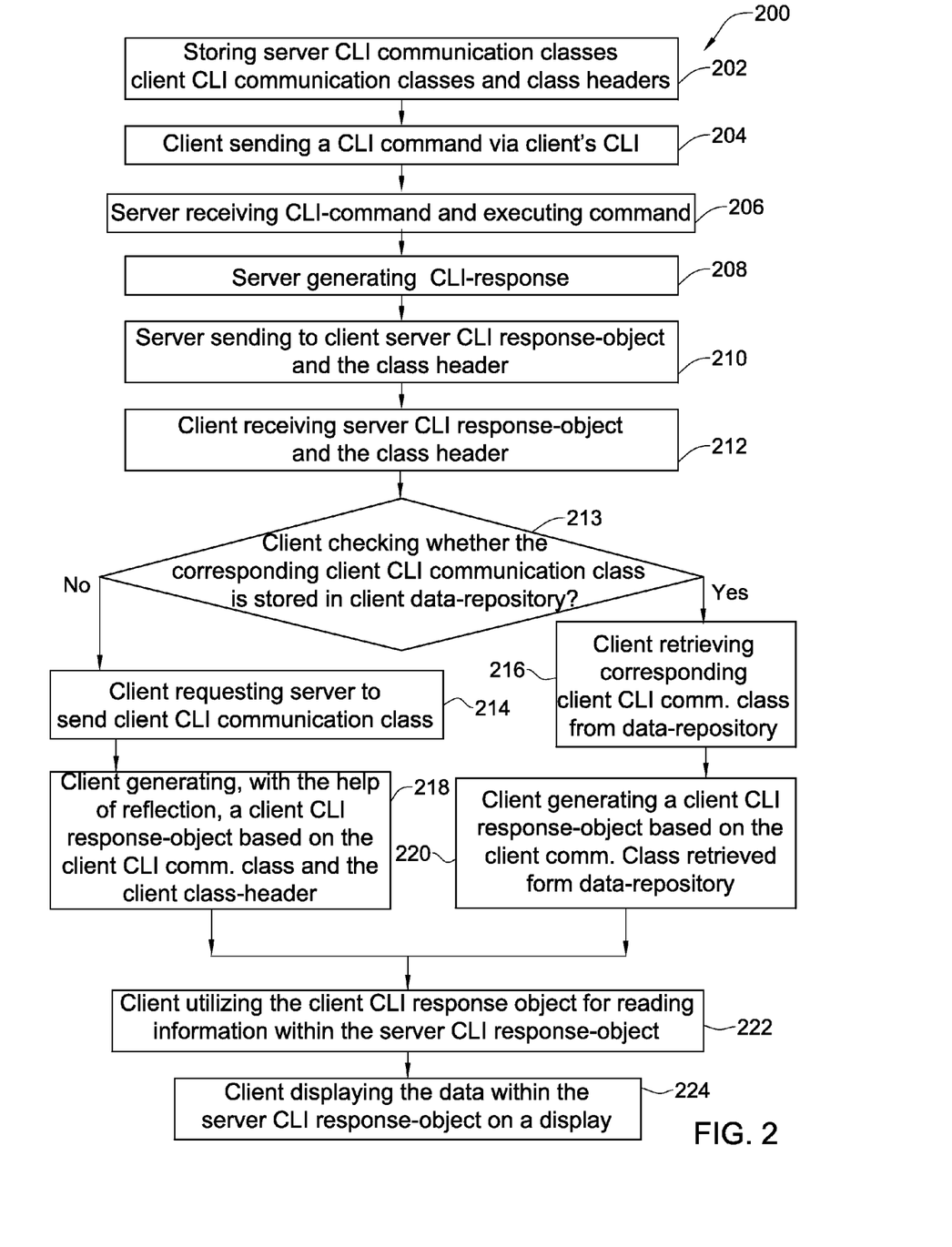
FIG. 2 is a flowchart showing the principle operations carried out, in accordance with an embodiment of the invention.
Figure 3:
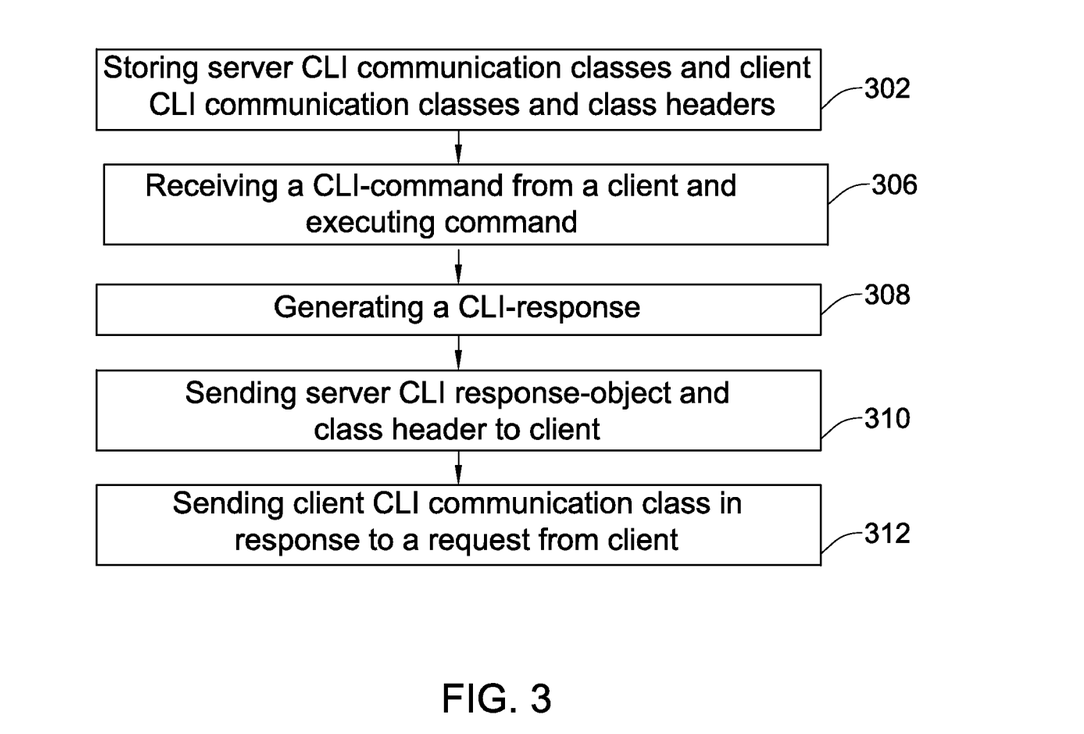
FIG. 3 is a flowchart showing the principle operations carried out by a server, in accordance with an embodiment of the invention.
Figure 4:
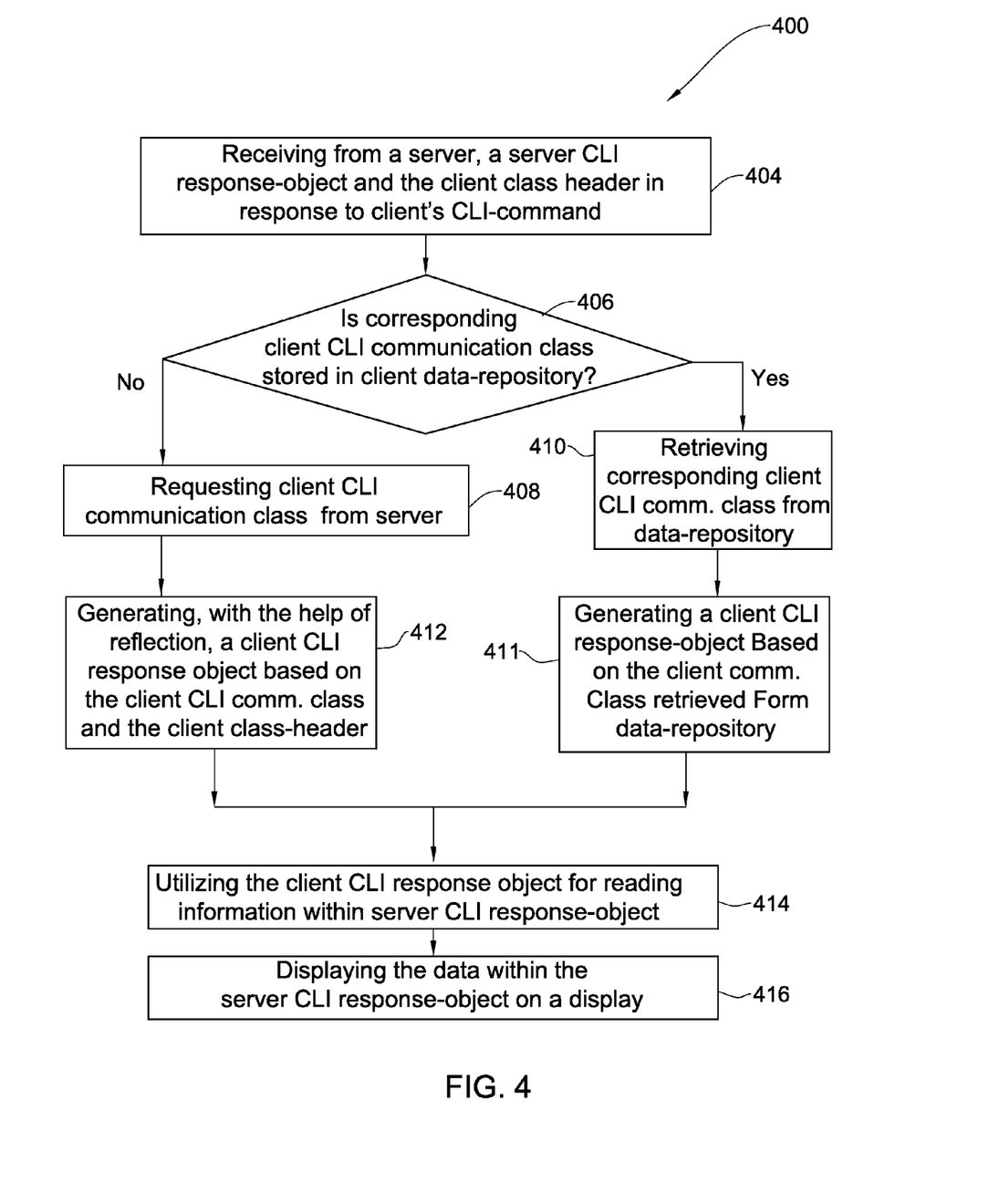
FIG. 4 is a flowchart showing the principle operations carried out by a client, in accordance with an embodiment of the invention.

In embodiments of the invention, fewer, more and/or different stages than those shown in FIG. 2, FIG. 3 and FIG. 4 may be executed. In embodiments of the invention one or more stages illustrated in FIG. 2, FIG. 3 and FIG. 4 may be executed in a different order and/or one or more groups of stages may be executed simultaneously. FIG. 1 illustrates a general schematic of the system architecture in accordance with an embodiment of the invention. Each module in FIG. 1 can be made up of any combination of software, hardware and/or firmware that performs the functions as defined and explained herein. The modules in FIG. 1 may be centralized in one location or dispersed over more than one location. In other embodiments of the invention, the system may comprise fewer, more, and/or different modules than those shown in FIG. 1.

Unless defined otherwise, all technical and scientific terms used herein have the same meaning as commonly understood by one of ordinary skill in the art to which this invention belongs. Generally (although not necessarily), the nomenclature used herein described below is well known and commonly employed in the art. Unless described otherwise, conventional methods are used, such as those provided in the art and various general references.

Turning now to a detailed description of certain embodiments of the present invention, one example of a common mechanism used by client to communicate with a server is a command-line interface (CLI). A CLI is a process implemented as a textual interface which enables a user to interact with a computer by typing commands requesting the computer to perform specific tasks. A CLI may be utilized for example, for interacting with a computer's own operating system or software or for interacting between different computers. A CLI is often used for sending CLI-commands (or requests) from a client (e.g. on one computer) to a server (e.g. on another computer).

The CLI-command (or request) is sent as a text message from the client to the server. The server executes the command and sends a response to the client. Although the server-response may return as a text-file, this approach is not widely used. A server-response in format of a text-file must be adapted to a specific inflexible textual format which is familiar and readable by the receiving client. Therefore, the server must have knowledge of certain properties of the receiving client which may vary from one client to another, for example, the type of applications and the type of buffers which are used by the receiving client. Thus, it is difficult to construct universal server-responses in text format while being unaware of the client's properties, and each server-response must be constructed according to the specific characteristics of a specific communicating client.

Accordingly, a common approach implemented in servers for returning a response is sending one or more objects, in response to a CLI-command issued by a client. In the following discussion such objects are named 'server CLI response-objects'. These server CLI response-objects are characterized by a known universal format which enables the server to provide the same type of objects to all communicating clients, while the server is not aware of specific characteristics of the client to which the objects are being sent. In this way the server is not required to adapt its responses to each specific client from which it receives a request. In general these objects are generated in runtime in response to a CLI-command by a complied code comprising appropriate server communication classes.

On the client side, the client is configured to recognize, read and display the incoming server CLI response-objects. In order to do so, the client is required to comprise appropriate software (i.e. code) for generating, in runtime, client CLI response-objects directed to enable the client to process and read server CLI response-objects sent by a server. Part of this code is provided to the client together with the CLI package which is installed on the client and enables the client to communicate with the server via a CLI. The code comprises appropriate inter alia, client communication classes for generating the relevant client CLI response-object.

However, new types of objects, which are generated by a server and are unfamiliar to the client, require that the client is provided with new code, (including inter alia, the corresponding communication classes) in order to enable the client to process and read the new objects. Therefore, when a new server CLI response-object is introduced by a server, new compatible code is required to be written locally, or otherwise obtained, for each client which receives the new server CLI response-object for the first time. The new code is adapted for processing and reading the new server response-object according to the specific properties of the relevant client. This shortcoming requires that users and/or administrators of each client continuously update the code utilized by the client and adapt it to continuous changes in objects received from the server.

According to certain embodiments there is provided a system and method which enables clients to automatically generate client CLI response-objects directed for reading new unfamiliar server CLI response-objects which are received from servers without the need to write or obtain new code for each new server response-object.

In the following description command line interface (CLI) communication is used to exemplify the present invention, however it should be noted that this is an example only which is used for the sake of better clarity and should not be construed as limiting the invention to CLI communication alone. While, the system and method disclosed herein may be implemented and operated for enabling automatic code generation for other types of client-server communication techniques as well.

Turning to FIG. 1, this block diagram schematically illustrates client-server architecture 100, in accordance with an embodiment of the invention. FIG. 1 shows a client 110 connected via a communication means or network (e.g. wired or wireless network implemented by any known technology) to a server 130. It should be noted that although FIG. 1 depicts a single client connected to a server, more than one client may connect and communicate with the same server and a single client may communicate with more than one server. The terms "client" and "server" as used herein may refer to the entire hardware device encapsulating the logic of a client process and/or server process. Alternatively or additionally the terms "client" and "server" may refer to a software implementation of the logic of a client or server (i.e. process) being embedded within an appropriate hardware device. Clients 110 may be, but are not limited to, personal or portable computers, PDAs, cellular phones or any other apparatus having the appropriate processing power for running a client process and equipped with the proper communication facilities. Servers 130 may be, but are not limited to, personal or portable computers. Servers are often implemented as dedicated server-computers which are characterized by faster CPU, high performance RAM and possibly multiple hard drives and a large storage space. Server 130 and client 110 in FIG. 1 are associated each, with at least one processor 150, 129, respectively. Processor 150 and 129 are configured to manage and control relevant components and operations, and to perform tasks in response to instructions generated by server 130 and client 110, respectively.

Client 110 comprises a client CLI application (or process) 120, configured in general for enabling the client to send CLI-commands to be performed by a server and receive in return CLI responses. In the context of the present invention the term "CLI-response" refers to a server-response sent from a server to a client in reply to a CLI-command. According to certain embodiments, client 110 is associated with a user interface 114 (e.g. a mouse and a key pad) and a display 116 (e.g. LCD screen). The user interface 114 and the display may be utilized by a user of client 110 for sending a CLI-command and viewing textual information in respect of outgoing CLI-commands and returning CLI-responses.

According to certain embodiments, client CLI application 120 comprises a command line interface (CLI) 128. Command line interface 128 is typically displayed on display 116 and is configured for enabling a user (e.g. via user interface 114) to type and send CLI-commands and to view data within incoming CLI-responses.

Turning now to the description of server 130 and its component, according to certain embodiments, server 130 comprises a server CLI application 140 and is associated with a server CLI communication-classes data-repository 132 and client CLI communication-classes data-repository 134.

Data-repositories 132 and 134 are configured for storing compiled code which includes server and client communication classes which are required for enabling communication between server 130 and clients 110 which connect to the server.

These classes include, inter alia, CLI communication classes which enable communication between server 130 and client 110 via a CLI. The server CLI communication classes are used for generating server CLI response-objects which are sent to clients in response to a CLI-command. The client CLI communication classes are used for generating client CLI response-objects configured for reading server CLI response-objects. Each CLI-command has at least one corresponding server CLI communication class and at least one corresponding client CLI communication class. The server CLI communication class is used by server 130 for generating a server CLI response-object for the corresponding CLI-command. The client CLI communication class is used by client 110 for generating a client CLI response-object which enables a client to read a corresponding server CLI response-object.

According to a certain embodiment, server CLI communication-classes data-repository 132 is configured for storing server CLI communication classes and client CLI communication-classes data-repository 134 is configured for storing client CLI communication-classes data-repository 134.

Data-repositories 132, 134 and 136 may be directly associated with server 130, for example they may be located on the same device as server 130, or directly connected to the device of server 130. Alternatively or additionally, data-repositories 132, 134 and 136 may be located on a remote device which is accessible to server 130 via any type of communication means or network (e.g. wired or wireless network). Data-repositories 132, 134 and 136 may be configured as a number of distributed data-repository units or as a single data-repository unit.

According to certain embodiments, together with the generation of server and client CLI communication classes, CLI client communication headers are also generated. In the context of the present invention the term client CLI communication header (or in short 'client class-headers' or 'class-header') are simplified data-structures that represent the backbone of a class including for example, function names and variable names of the different fields and attributes corresponding to each class. According to certain embodiments of the invention, these client class-headers are essential for the generation of new client CLI response objects, as explained in more detail below. Client class-headers may be stored, for example, within client communication-classes data-repository 134 or otherwise within a specifically designated data-repository.

One example of a method of generating client and server communication classes, (including CLI communication classes) is by utilizing Google's Protocol Buffers utility (abbreviated Protobuff). Protobuff is an automated mechanism for serializing structured data. Protobuff enables to create relatively simple structures representing the desired client classes and server classes and then by using specifically generated source code, to easily write and read the structured data to and from a variety of data streams by using a variety of languages. Protobuff runs as part of the pre-compiling process of the server and client codes. For example, Protobuff enables to produce from a single structure, two new types of communication classes, a communication class, associated with a C++ code running in the server and a communication class associated with the Java code and running in the client. (For more information with regard to Protobuff see http://code.google.com/p/protobuf/).

In addition to the different classes which may be generated, the Protobuff pre-compilation process also produces client class-headers of the compiled classes. Thus, Protobuff provides a simple method for generating both client and server communication class and the corresponding client class-headers.

Alternatively or additionally, server and client communication classes and class headers may be generated by other methods. For example, client communication classes and server communication class may be generated manually by writing the code for each type of class individually. Headers may be generated automatically for example by utilizing Simple Object Access Protocol (SOAP). In general SOAP is a protocol specification for exchanging structured information between servers in computer networks. When using SOAP in a server, in response to a request (e.g. CLI-command) which is sent to the server, the server may return an XML-formatted document with the resulting data. Thus, according to certain embodiments, SOAP may be utilized for generating a header including for example the variable name of the different fields and attributes corresponding to each class. According to certain embodiments, the XML header may be utilized as a client class-header for the purpose of the present invention as explained below.

Continuing now to describe server CLI application 140, according to certain embodiments, it may comprise a CLI-command manager 142, a server object generator 144 and a CLI response manager 146. CLI-command manager 142 is configured to receive a CLI-command from a client and execute the command (e.g. perform a requested task) specified by the CLI-command. According to certain embodiments, CLI-command manager 142 is associated with processor 150 which performs any processing which may be required for the execution of the CLI-command. CLI-command manger 142 is further configured to receive a CLI-response, which is generated by CLI response manager 146 and send it to client 110.

According to certain embodiments of the invention, each CLI-response is constructed according to the corresponding CLI-command and comprises three main elements: a client CLI communication class corresponding to the relevant CLI-command, the client class-header and the server CLI response-object.

According to certain embodiments, server object generator 144 is configured to receive from CLI response manager 146, information with regard to the CLI-command that was received from the client, identify the relevant server CLI communication class (e.g. within data repository 132) and generate a corresponding server CLI response-object being an instance of the corresponding server CLI communication class. The server CLI response-object is generated by utilizing an appropriate code which may be available for example in a server code repository 136. The server CLI response-object is transferred to CLI response manager 146.

According to certain embodiments of the invention, in response to a CLI-command, in addition to the generation of corresponding server CLI response-object by server object generator 144, CLI response manager 146 is further configured for retrieving a client CLI communication class and a corresponding client class-header from data-repository 134. The client CLI communication class is the corresponding client class of the CLI-command, which can be utilized for generating the appropriate client CLI response-object for reading the server CLI response-object generated by the server. According to certain embodiments, the CLI response manager 146 is configured to transfer the CLI response to CLI-command manager 142. The CLI-command manager 142 in turn is configured to send the CLI response to the client.

Returning to client 110, according to certain embodiments, client CLI application 120 further comprises a client response manager 122, an object reader 126, and client CLI object generator 124. According to certain embodiments, a client data-repository 112 is used to store client class headers and possibly client CLI communication classes, which were previously utilized by client 110. Data-repository 112 may be directly associated with client 110, for example it may be located on the same device as server 110, or directly connected to the device of client 110. Alternatively or additionally, data-repository 112 may be located on a remote device which is accessible to client 110 via any type of communication means or network (e.g. wired or wireless network).

According to certain embodiments, client response manager 122 is configured to receive the CLI response sent by CLI-command manager 142, and determine whether the client CLI communication class, adapted for generating a client CLI response-object for the incoming server CLI response-object, is stored in a client data-repository 112. In case the client response manager 122 finds that the relevant client CLI communication class is stored in client data-repository 112, it retrieves the client CLI communication class and forwards it to client object generator 124. Client object generator 124 is configured to generate a client CLI response-object from the client CLI communication class. Otherwise, in case the client CLI communication class is not found in data-repository 112 client response manager 122 instructs client object generator 124 to generate a new client CLI object based on the client CLI communication class and the client class-header which are received from server 130.

According to certain embodiments, the client CLI response-object is generated with the help of Reflection oriented programming (or reflection programming), based on the client CLI communication class and the client class-header. Reflection oriented programming is a process which enables dynamic program modification, which can be determined and executed at runtime. In reflective programming, information in respect of the program structure, which is often lost once the program is compiled, is stored. This information includes for example, the class name, the name the methods contained within the class, other attributes etc. Reflection allows to write code that works with classes selected during execution, not in the source code. The classes are accessed and selected by using the stored information pertaining to the relevant classes. Thus, codes can be assembled in run-time without being pre-coded before compilation. For further information with regard to reflection programming see http://portal.acm.org/citation.cfm?id=62084.62111.

According to certain embodiments of the invention client object generator 124 is configured to utilize the client class-header and the (compiled) client CLI communication class and with the help of reflection programming to generates a new client CLI response-object. The class header provides the required information (metadata) with regard to the structure of the client CLI communication class. This information is used by an appropriate code, written in accordance with the reflection programming paradigm, to access the client CLI communication class and to create, in run-time, a client CLI response-object from the client CLI communication class. Reflection programming saves specific data which allows associating between the metadata and the relevant class and creating an instance of that class in run-time. The written code is generic and is not tied to a specific CLI communication class, thus it may be used to generate an object of any given class.

The client is thereby enabled to automatically generate an appropriate client CLI response-object for reading an incoming server CLI response-object, which is unfamiliar to the client without the intervention of a human programmer and without the need to write a specific code directed for generating a specific object.

According to a certain embodiment, once the new client CLI response-object is created, object reader 126 is configured to use the new client CLI response-object for reading the server CLI response-object sent by the server. According to certain embodiments, the information within the server CLI response-object is transferred to CLI 128 and displayed on display 116.

According to certain embodiments, instead of sending the entire CLI response the CLI response manager 146 is configured to transfer the server CLI response-object and the client class-header to the CLI-command manager 142, while delaying the transmission of the client CLI communication class. The CLI-command manager 142 is configured to send the server CLI response-header and the class header to the client. In case it is determined that a corresponding client CLI communication class is available at the client, the class is used for generating a client CLI response-object and the generated object is used for reading the received server CLI response-object. Otherwise, in case it is determined that the relevant client CLI communication class is not available at the server, client 110 is configured to send a request to server 130 requesting that the corresponding client CLI communication class, which was delayed at server 130, is sent to the client. Once the client CLI communication class is received at the client, it is used together with the previously received client class-header for generating a new client CLI response-object, with the help of reflection programming. According to certain embodiments, the client CLI communication class is not retrieved and assembled as part of the CLI-response until after a specific request is received from client 130.

According to some embodiments, instead of sending the entire CLI response, the CLI response manager 146 is configured to transfer the client CLI communication class and the client class-header to the CLI-command manager 142, while delaying the transmission of the server CLI response object. The CLI-command manager 142 is configured to send the client CLI communication class and the class header to the client. Once a new client CLI response-object is created, client response manager 122 requests from server 130 to send to client 110 the server CLI response-object, which has been previously delayed by CLI command manager 142. The server CLI response-object is received by client response manager 122 and sent together with the corresponding new client CLI response-object to object reader 126 for reading.

FIG. 2 is a flowchart 200 showing the principal operations carried out, in accordance with an embodiment of the invention. It should be noted that while FIG. 2 illustrates operations performed by both a client and a server, FIG. 3 illustrates the operations performed only by a server and FIG. 4 illustrates operation performed only by a client. As stages in FIG. 2 overlap with stages in FIG. 3 and FIG. 4, in the following discussion where overlapping stages, which are relevant to more than one figure, are described, reference is made to all relevant figures.

In the initial stage 202, (302), client and server CLI communication classes are stored in designated communication-class data repositories associated with the server. Stage 202 is preceded with a stage which may be considered as a preliminary stage, in which the code of the client and server communication classes which enable communication between a server to a client is generated and compiled. According to certain embodiments, the generated communication classes include at least server and client CLI communication classes. As mentioned above, in some embodiment, this stage is performed with the help of Protobuff or it may be performed by other methods. The generated classes are stored in designated communication-class data-repositories. The generated classes are directed for generating corresponding client CLI objects in the client and server CLI object in the server directed for handling client-server communications by CLI. As mentioned above, as part of the preliminary generation process of client CLI communication classes, client class-headers are also generated. The class-headers are stored in the appropriate data repository as well.

According to certain embodiments, in stage 204 a CLI-command is sent from client to server. For example the communication may be initiated by client 110 sending a CLI-command via a client CLI 128 to CLI-command manager 142 in server 130. In the next stage 206, (306) the CLI-command is received by the server and the server attempts to execute the CLI-command. As mentioned above a CLI-command is a request, made to a server by a client, to perform a certain task. Once the server receives the request it attempts to complete the task.

According to certain embodiments, in the following stage 208, (308), the server generates a CLI-response to the client. The CLI-response comprises a client CLI communication class, the client class-header and a server CLI response-object. Client CLI communication class is the client class which is used as a template to create a client CLI response-object. A client CLI response-object, which is generated based on a client CLI communication class, is used to read a corresponding server CLI response object. In some embodiments, the relevant client CLI communication class and the class header are retrieved by CLI response manager 146 from client communication-classes data-repository 134. Server CLI response-object is generated by the server based on a corresponding server CLI communication class.

Alternatively, CLI-response may comprise of only sever the CLI response-object and the client class-header, while the client CLI communication class is retrieved from data-repository and send to client only in response to a specific request.

According to one embodiment, a CLI-response is divided into two parts, the first part comprising the server CLI response-object and the client class-header and the second part comprising the client CLI communication class. In stage 210, (310) the first part of the CLI response is sent to the client. For example, the server CLI response-object and the client class-header may be transmitted from CLI response manger 146 to CLI-command manger 142 and then sent to client 110. In stage 212, (404) the client receives the server CLI response-object and the client class-header which are sent by the server. The server CLI response-object and the client class-header may be transferred, for example, to client response manager 122.

According to certain embodiments, in stage 213, (406) it is determined whether the corresponding client CLI communication class, configured for generating a client CLI response-object for reading the incoming server CLI response-object, is available to the client. To this end, in one example, the incoming client class-header is compared with other client class-headers which are stored in a data-repository associated with the client. In some cases the comparison between the client class-headers stored at data-repository and new client class-headers received from server 130 may be based on exact identity between the client class-headers, while in other cases partial similarity (e.g. restricted to a specific subset of fields of the client class-header) may suffice.

According to certain embodiments, in case it is determined in the previous stage that the corresponding client CLI communication class is not available to the client (e.g. the incoming client class-header is not stored in the client data-repository indicating that the relevant communication class has never been used by the client) stage 214, (408) follows. In stage 214 (408) the client requests the server to send the previously delayed client CLI communication class. In response to the request issued by the client, the server sends to client the corresponding client CLI communication class (stage 312).

According to some embodiments, the CLI-response is not divided and is transmitted from server 130 to client 110 in its entirety including client CLI communication class, client class-header and server CLI response-object. In this embodiments, stage 214 (408) may be omitted.

Once the client CLI communication class is received at the client, a client CLI response-object is generated, based on the client CLI communication class and the client class-header with the help of reflection programming (see stage 218 (412)). Thus, in stage 218 (412) the client automatically generates an appropriate client CLI response-object for reading an incoming and server CLI response-object, where the incoming server CLI response-object is unfamiliar to the client and where the client is not configured with a specifically programmed code for reading the specific incoming object.

a client CLI response-object for reading an incoming server CLI response-object, wherein the incoming server CLI response-object is unfamiliar to the client A more detailed explanation with regard to reflection programming is specified above with reference to FIG. 1. Stage 218, (412) may be performed for example, by client object generator 124.

According to certain embodiments, in case it is determined in stage 213 (406) that the corresponding client CLI communication class is available to the client (e.g. the incoming class header is stored in the client data-repository indicating that the relevant communication class has already been used in the past by the client) stage 216, (410) follows. Stage 213 (406) may be performed for example by client response manger 122. In stage 216 (410) the corresponding client CLI communication class is retrieved from the appropriate data-repository and in stage 220 (411), a client CLI response-object is generated based on the retrieved client CLI communication class. Stage 220 (411) may be performed for example by client object generator 124.

At this stage of process 200 client 110 comprises a client CLI response-object which can be used to read the incoming server CLI response-object. According to certain embodiments, in stage 222, (414) the client utilizes the client CLI response-object and reads the information within the server CLI response-object. According to certain embodiments, the information within the server CLI response-object is displayed to the user via an associated display 116.

According to certain embodiments, client 110 does not store client CLI communication classes and is rather configured to always generate client CLI response-objects based on client CLI communication classes and class headers which are received from a server. According to this embodiments, stage 213 (406) is omitted and once the CLI-response is received by the client, client turns to generating, with the help of Reflection programming, the client CLI-response object based on the received client CLI communication class and the received client class-header as described above with reference to stage 218 (412).

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A method of automatic generation of client command line interface (CLI) response-objects, said objects being configured for reading a server CLI response-object sent by a server to a client in response to a CLI-command sent by said client, the method being carried out in a client, and comprising:
   (a) receiving from said server at least one CLI response comprising at least a server CLI response-object and a client class-header of a corresponding client CLI communication class, said client CLI communication class being configured for generating the client CLI response-object for reading said server CLI response-object;

(b) determining whether said client CLI communication class is stored in a data-repository associated with said client wherein in case said client CLI communication class is not stored in said data-repository, requesting said client CLI communication class from said server and receiving said client CLI communication class from said server; and wherein in case said client CLI communication class is stored in said data-repository, retrieving said client CLI communication class from said data-repository;

(c) generating a client CLI response-object configured for reading said server CLI response-object, wherein said generating is based on said client CLI communication class and said received client class-header and by using a processor for utilizing reflection programming; and (d) utilizing said client CLI response-object for reading data provided within said server CLI response-object, wherein said utilizing is performed by using a processor.

2. The method of claim 1 further comprising stage (e) of displaying a textual message within said server CLI response-object on a display.

3. The method of claim 1 wherein said client CLI communication class, said server CLI communication class and said client class-header are generated by utilizing Google Protocol Buffer utility.

4. The method of claim 1 wherein said client class-header is an XML based header and is generated by utilizing Simple Object Access Protocol.

5. The method of claim 1 wherein said server CLI response-object is generated by said server based on a server CLI communication class corresponding to said CLI-command.

6. The method of claim 1 wherein said CLI response further comprises said server CLI response-object.

7. The method of claim 1 wherein said determining is performed by comparing said client class-header with at least one other client class-header stored at said data-repository.

8. A method of automatic generation of client command line interface (CLI) response-objects configured for reading a server CLI response-object sent by a server to a client in response to CLI command sent by said client, the method being carried out in a server and comprising:

(a) retrieving from a communication-classes data-repository a server CLI communication class, a client CLI communication class and a client class-header that are associated with said CLI-command; said server CLI communication class is adapted for generating a server CLI response-object, which is unfamiliar to the client, and said client CLI communication class is constructed according to specific characteristics of said client and configured for generating a client CLI response-object for reading data within said CLI response-object;

(b) generating a server CLI response-object of said CLI-command, wherein said generating is based on said server CLI communication class and is performed by using a processor, and;

(c) sending a CLI response to said client in reply to said CLI-command from said client; said CLI response comprising at least said server CLI response-object and said client class-header; and (d) sending said client CLI communication class to said client; wherein said client CLI communication class and said client class-header enable said client to generate, with the help of reflection programming, a client CLI response-object, and to utilize said client CLI response-object for reading information from said server CLI response-object.

9. The method of claim 8 wherein said CLI response further comprises said server CLI response-object.

10. The method of claim 8 wherein stage (d) is performed in response to a request issued by said client.

11. The method of claim 8 wherein a Google Protocol Buffer utility is used to instruct a processor to generate said client CLI communication class, said server CLI communication class and said client class-header.

12. The method of claim 8 wherein said client class-header is an XML based header and is generated by utilizing Simple Object Access Protocol.

13. The method of claim 8 wherein said server is associated with at least one data repository and wherein said server CLI communication class, said client CLI communication class and said client class-header are obtained from said at least one data-repository.

14. A client being operable in a client-server communication architecture, said client being configured to read a server command line interface (CLI) response-object sent by a server in response to a CLI-command, said client comprising:

a processor, and a client CLI process, the client CLI process comprising a CLI object generator; said processor being configured to perform tasks in response to instruction generated by said client;

said client CLI process is configured to send a CLI-command to a server and receive a CLI response from said server, said CLI response comprising, a client class-header and a server CLI response-object;

said client CLI process is configured to determine whether a client CLI communication class associated with said client class-header is stored in a data-repository associated with said client; wherein in case said client CLI communication class is not stored in said data-repository, said client CLI process is configured to request said client CLI communication class from said server and to receive said client CLI communication class from said server; and wherein in case said client CLI communication class is stored in said data-repository, said client CLI process is configured to retrieve said client CLI communication class from said data-repository;

said client CLI object generator is configured to provide said processor with instructions for generating a client CLI response-object, wherein said client CLI response-object is generated with the help of reflection programming, based on said client class-header and said client CLI communication class;

said CLI process is further configured to provide said processor with instructions for utilizing said client CLI response-object for reading said server CLI response-object.

15. The client of claim 14 being associated with a display and wherein said client CLI process is further configured to display the information within said server CLI response-object on said display.

16. The client of claim 14 wherein said client class-header is generated by Google Protocol Buffer utility.

17. The server of claim 14 wherein said CLI-response is divided into two parts, a first part comprising said server CLI response-object and class-header and a second part comprising client CLI communication class; and wherein said server CLI application is configured to send said first part in response to a CLI-command and send said second part in response to a specific request from said client.

18. A server being operable in a client-server communication architecture, said server being configured for receiving a command line interface (CLI)-command from a client and returning a server CLI response-object to said client the server comprising:
  a CLI server process and a processor; said processor being configured to perform tasks in response to instructions generated by said server;
  in response to a CLI-command received from a client, said CLI server process is configured to instruct said processor to perform at least the following:
  (a) retrieve from a data-repository a corresponding server CLI communication class configured for generating a server CLI response-object, which is unfamiliar to the client;
  (b) retrieve from said data-repository a client CLI communication class associated with said CLI-command; wherein the CLI communication class is constructed according to specific characteristics of said client and configured for generating a CLI object for reading said server CLI response-object;
  (c) retrieve from said data-repository a client CLI communication class-header, associated with said CLI-command and corresponding to said client CLI communication class;
  (d) generate a server CLI-response-object being an instance of said server CLI communication class;
  said CLI server application is further configured to send to said client a CLI-response, said CLI response comprising said server CLI-response-object, said class-header and said client CLI communication class, thereby enabling said client to utilize said class-header and said client CLI communication class and, with the help of reflection programming, to generate a client CLI response-object configured for reading said server CLI response-object.

19. The server of claim 18 wherein said server CLI communication class, client CLI communication class and client class-header are generated by utilizing Google Protocol Buffers utility.

* * * * *

UNITED STATES PATENT AND TRADEMARK OFFICE
CERTIFICATE OF CORRECTION

PATENT NO.         : 8,280,950 B2
APPLICATION NO.    : 12/699179
DATED              : October 2, 2012
INVENTOR(S)        : Gil Boruhovski et al.

Page 1 of 1

It is certified that error appears in the above-identified patent and that said Letters Patent is hereby corrected as shown below:

On the title page, (73) Assignee: "Xsignnet Ltd., Herzliya (IL)" should read --Infinidat Ltd., Herzliya Pituach, IL--.

Signed and Sealed this
Thirty-first Day of December, 2013

Margaret A. Focarino
*Commissioner for Patents of the United States Patent and Trademark Office*